Oct. 22, 1940.  G. D. DILL  2,218,604

HORIZONTAL CATALYTIC REACTOR

Filed Dec. 22, 1938  4 Sheets-Sheet 1

Gilbert D. Dill Inventor
By ―― Young Attorney

Oct. 22, 1940.   G. D. DILL   2,218,604
HORIZONTAL CATALYTIC REACTOR
Filed Dec. 22, 1938   4 Sheets-Sheet 2

Gilbert D. Dill Inventor
By  Young Attorney

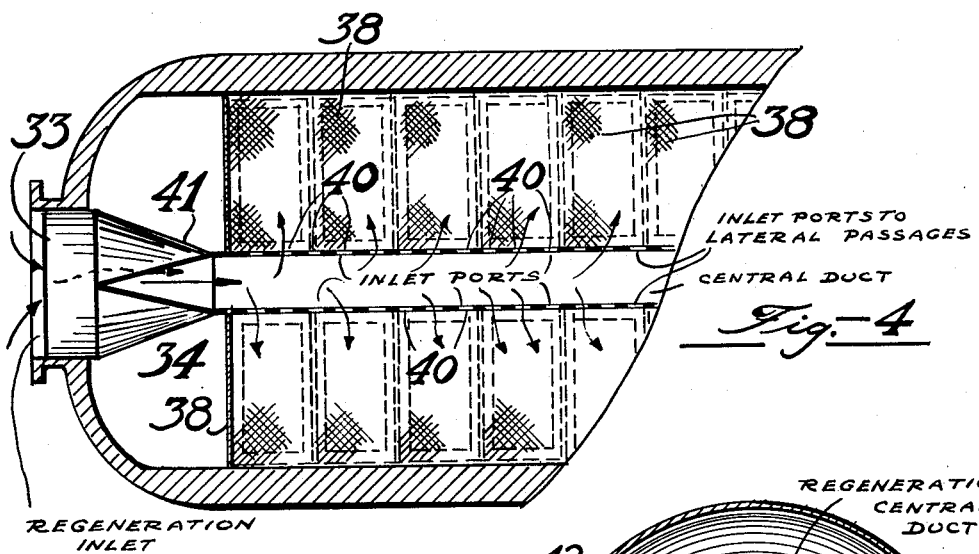
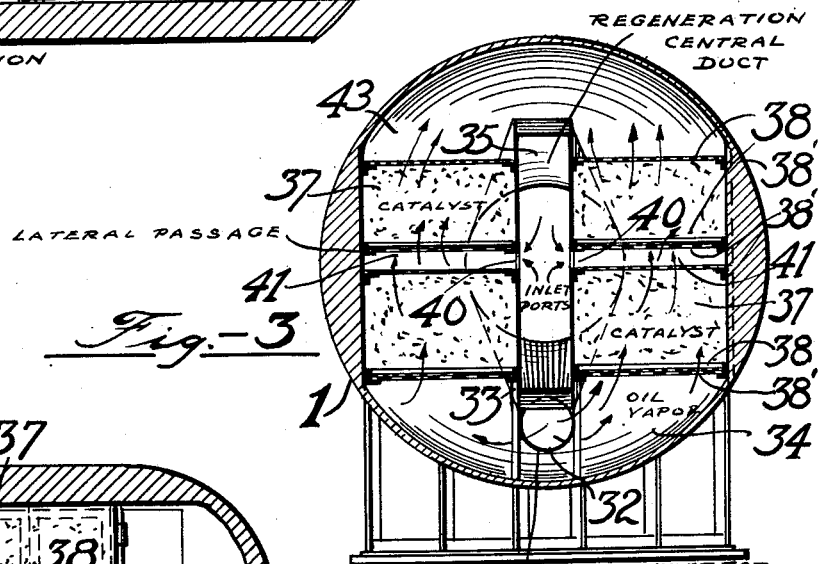
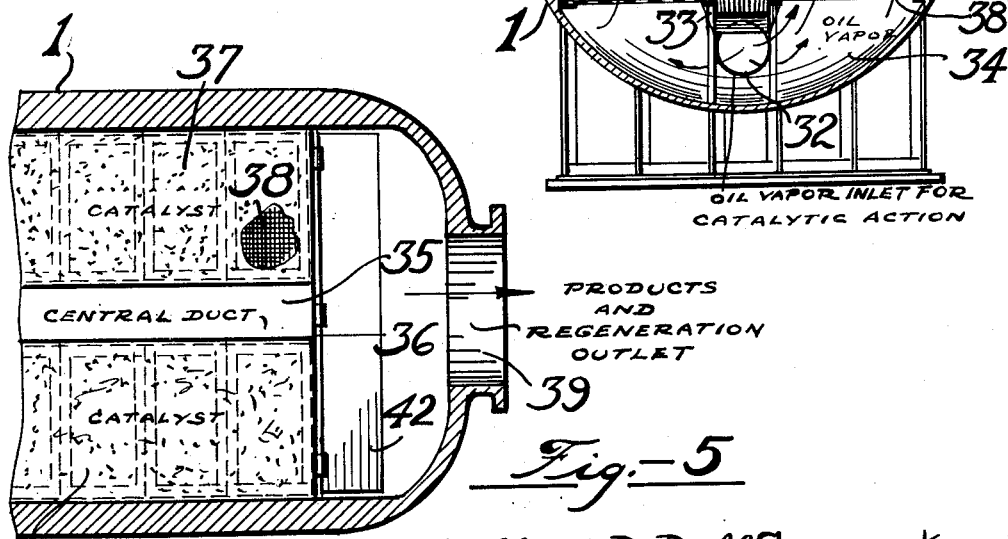

Oct. 22, 1940.  G. D. DILL  2,218,604
HORIZONTAL CATALYTIC REACTOR
Filed Dec. 22, 1938  4 Sheets-Sheet 4
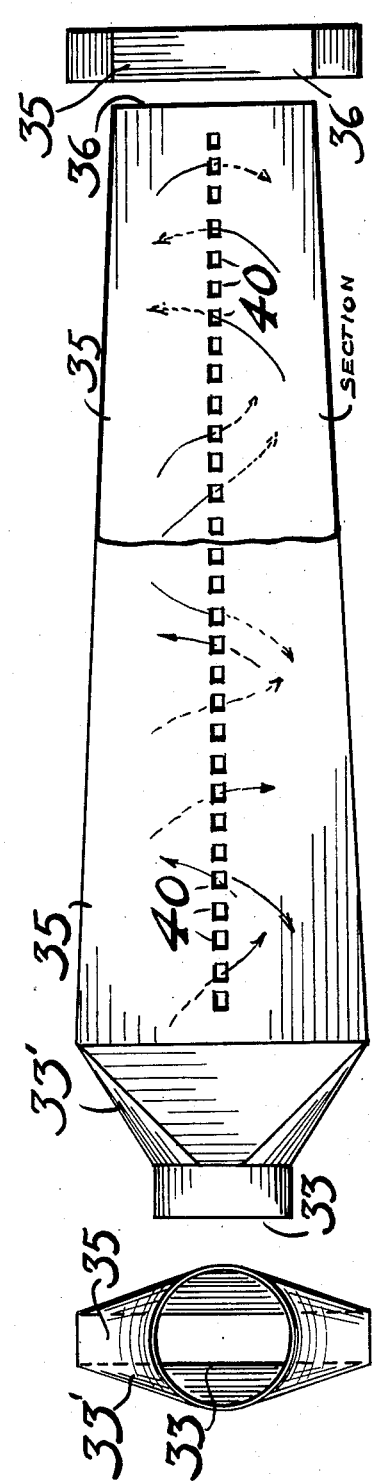
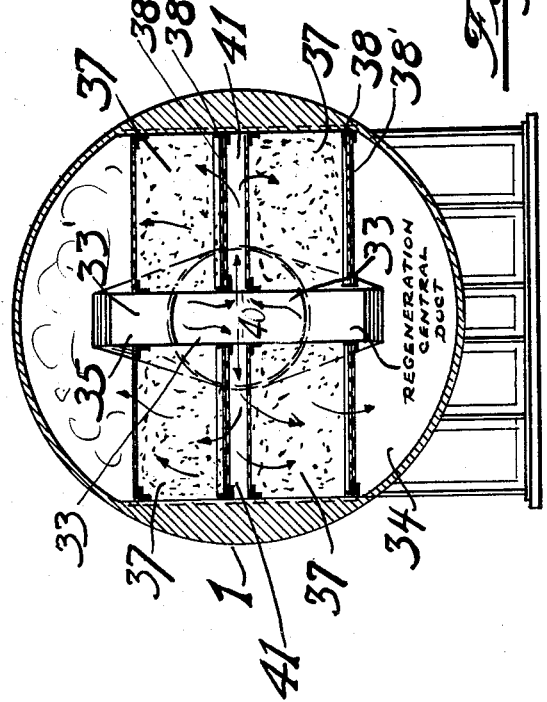

Patented Oct. 22, 1940

2,218,604

UNITED STATES PATENT OFFICE 2,218,604

HORIZONTAL CATALYTIC REACTOR

Gilbert D. Dill, Chicago, Ill., assignor to Standard Oil Development Company, a corporation of Delaware Application December 22, 1938, Serial No. 247,211

2 Claims. (Cl. 23—288)

This invention relates to improvements in apparatus and more particularly to a catalytic apparatus wherein is a plurality of beds of solid materials divided into small pieces and containing interstices through which the fluids may flow.

Where solid material divided into small pieces and containing interstices through which fluids flow are used as catalysts and one body or mass of the solid divided material is used, there is a substantial pressure drop of the fluid contacting and passing through the said mass of solid divided material. Therefore, high differential pressures from one side of the catalyst bed to the other side are required to maintain a constant rate of flow of fluid through the mass of solid divided material.

It is an object of this invention to regulate the mass of catalytic material in various beds so that the fluid may readily contact all the beds at the same time for a definite period of time, or, if desired, the fluid may come in contact with larger or smaller masses of the catalytic material as the operation may require without any high differential pressures being required.

Another object of this invention is to change the fluid flow from series to parallel or vice versa without the use of valves placed within the reactor.

Further objects are to permit free expansion in all directions of the materials in the reactor and also avoiding heavy stressing of the materials entering into the construction of the reactor and thereby reducing the amount of expensive structural material entered into the construction of the reactor.

Further objects are to provide means for maintaining the form of each bed of solid and to avoid the use of special metals in the construction of an outer shell of the reactor.

These and other objects of the invention will be clearly understood when the following description is read with reference to the accompanying drawings.

Fig. 3 is a cross-sectional view taken at II—II of Fig. 2, illustrating the flow of a fluid;

Fig. 4 is a downward-sectional view taken at III—III of Fig. 2;

Fig. 5 is another downward-sectional view taken at IV—IV of Fig. 2;

Fig. 6 is another cross-sectional view of the reactor and duct illustrating the flow of a regenerating fluid;

Fig. 7 is a side view of the reactor and duct partly cut away;

Fig. 8 is an end view of the inlet portion of a central vertical duct in the reactor; and Fig. 9 is an end view of the central vertical duct in the reactor.

Figure 1:
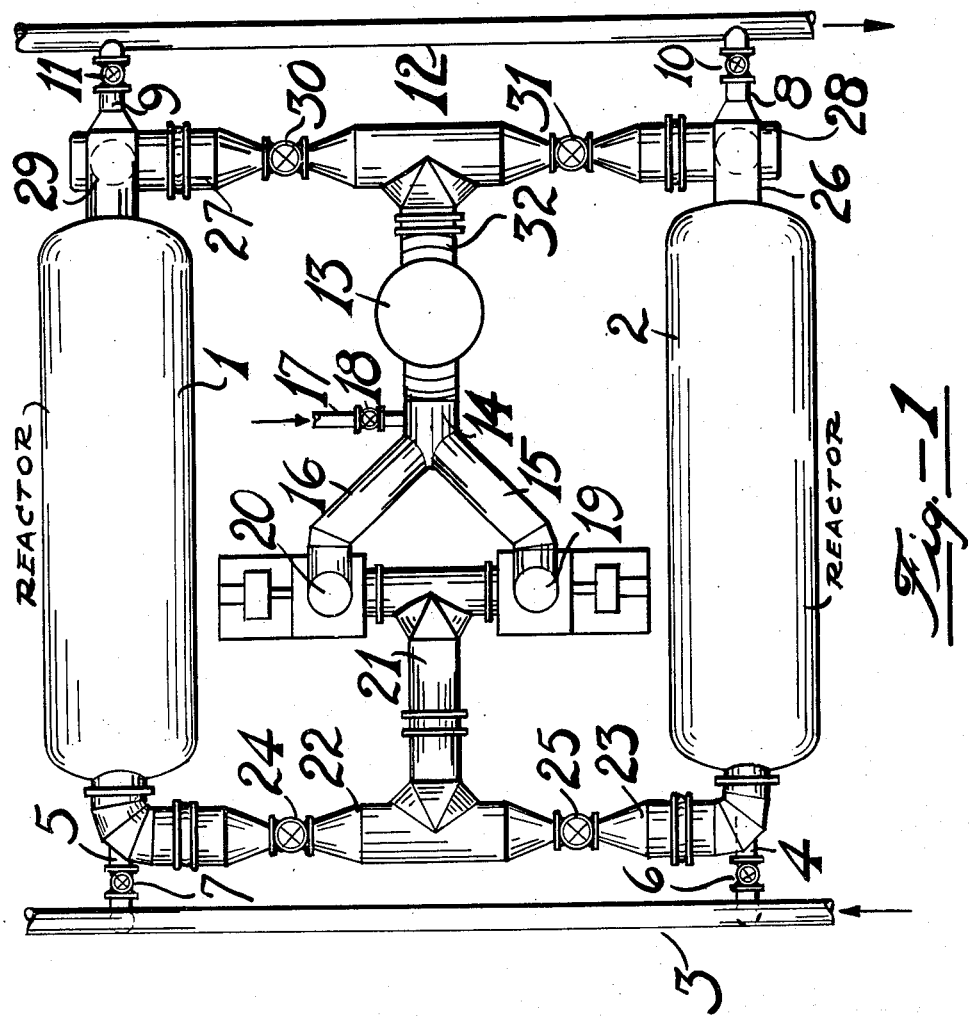
Fig. 1 is a diagrammatic sketch of a top plan view showing the apparatus used according to this invention.

Referring to the drawings, in Fig. 1 numerals 1 and 2 indicate reaction chambers wherein is placed the solid catalytic material in the form of granules or pills. One or a plurality of reactors may be used. The oil vapors or other fluids that are to be reacted are taken from a supply pipe 3 and passed through pipes 4 and 5 provided with valves 6 and 7 into the reaction chamber. The fluids, after having passed through the reactor, are withdrawn through pipes 8 and 9 provided with valves 10 and 11 and passed into pipe 12 and then passed to storage (not shown).

The solid catalytic material slowly loses its catalytic activity and must either be replaced with a fresh charge of the catalytic material or regenerated. This apparatus is especially designed to use a catalytic material which is to be regenerated, for example, when a deposit of coke is formed, that lessens the surface contact of the catalytic material and the reacting fluid. The spent catalyst is then contacted with an oxygen-containing gas at an elevated temperature to oxidize the coke and other impurities and remove them from the reaction vessel.

The temperature of a fluid that is used to regenerate the catalytic material in the reactors is regulated by means of a heat exchanger 13 and the fluid is then passed through pipe 14 into pipes 15 and 16. The desired temperature of the regenerating fluid is that at which oxidation of the coke or other impurities is readily obtained. Fresh air or other regenerative gas may be added into pipe 14 by means of pipe 17 provided with valve 18 to replenish the fluid that is used to regenerate the catalytic material. The pressure of the fluid is regulated by a pump not shown arranged on pipe 17. Blowers 19 and 20 are provided to aid the flow of material and to take up pressure drop of the fluid. It is not intended to limit this apparatus to the use of any specified number of blowers, as one or more blowers may be used. The fluid is passed into pipe 21 and through pipes 22 and 23, provided with valves 24 and 25 into the reactor. The regenerative gas, after passing through the reactor, is withdrawn through pipes 26 and 27 provided with butterfly valves 28 and 29 and valves 30 and 31 and recycled through pipe 32 to the heat exchanger 13.

In operating this apparatus, when oil vapors or other fluids are to be passed through the reactor, valves 24, 25, 30 and 31 and butterfly valves 28 and 29 are closed, valves 6, 7, 10 and 11 being open to allow the passage of the oil vapors through the reactors. The reactors may be used alternately, that is, one reactor may be used to catalytically react with oil vapors while the catalytic material in the other reactor is being regenerated. When the reactors are used to regenerate the catalytic material, valves 6, 7, 10 and 11 are closed and valves 24, 25, 28, 29, 30 and 31 are open. The valves are used to control the direction of flow of material and the valves may be adjusted so that one reactor is used to catalytically react with an oil vapor, while the catalytic material in the other reactor is being regenerated.

Figure 2:
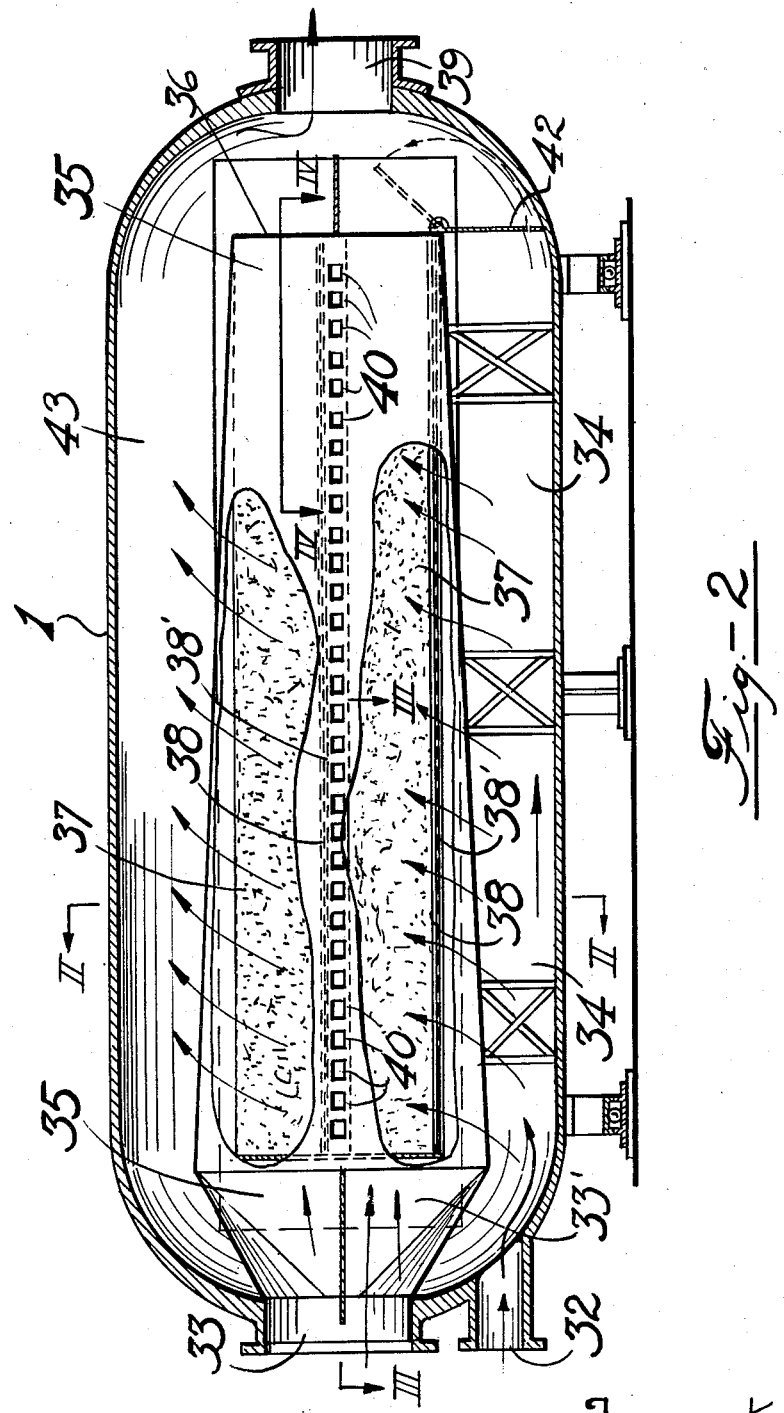
Fig. 2 is a longitudinal sectional view of the reactor.

Referring to Fig. 2, in a reactor such as 1 or 2, two inlets 32 and 33 are provided to pass fluids into the reactor, inlet 32 to pass fluids into the lower part 34 of the reactor and inlet 33 to pass fluids into a central vertical duct 35 arranged in the central part of the reactor 1 and closed on the opposite end 36. In the central part of the reactor 1 are supported two double tiers 37 of a series of beds of catalysts. The catalytic material is in divided granular or pill form and is retained in place by means of screens 38 which in turn are supported by grids 38'. The catalytic material that is held in the two double tiers of a series of beds extending to both sides of the reactor, forming tight jointures with the inner walls of the reaction vessel and in the center with the outer walls of the central horizontal duct 35 that runs from the inlet 33 towards the outlet 39 and has a closed end 36 that is in space relation to the outlet 39. The two double tiers 27 are arranged to provide fire spaces 41 between the upper and lower layers. Ports 40 are provided in the central horizontal duct 35 to pass the fluid from the central duct to lateral passages 41 that divide the series of beds of catalytic material to upper and lower tiers of a series of beds, from which lateral passages 41 the fluid may pass upward or downward through the catalytic beds. The fluid entering through inlet 33 can only pass into the central duct and not directly into the lower part of the reactor, a closed passage 33' connecting the inlet to the central duct 35. A hinged plate 42 is provided to allow or stop the passage of a fluid from the lower part of the reactor 34 into the end part of the reactor to the outlet 39. Alternately two outlets in place of outlet 39 may be provided with a fixed plate arrangement separating the outlets from lower space 34 and the upper space 33 of the reaction vessel. Plate 42 may be dispensed with, the direction of flow of the fluid being regulated through the catalytic bodies by valves arranged with these two outlets. When only one outlet is used, the gas passes from the upper space 43 of the reactor into the outlet 39.

When operating the reactor to catalytically crack a petroleum hydrocarbon, oil is passed into lower part 34 of the reactor by means of the inlet 32, plate 42 is used to stop the flow of oil directly to outlet 39 from space 34. The oil vapors pass upward through both layers of the catalytic beds 37 into the upper part 43 of the reactor and are withdrawn from the reactor by means of outlet 39. When the reactor is being used to regenerate the catalytic material, the baffle 42 is opened to allow passage of fluids directly from lower part 34 of the reactor to outlet 39. An oxygen-containing gas or other regenerating fluid is introduced into the reactor through inlet 33, passes through the central duct 35 and through ports 40 into the lateral passages 41. The regenerating fluid passes both upward and downward through the catalytic beds 37 into the lower part 34 of the reactor and the upper part 43 of reactor 1. The gas is withdrawn through outlet 39 and passed to boiler 13. The central duct 38 is relatively quite large and tapered in form in order to allow a large volume of reactive fluid that is used for regenerating the catalyst to quickly contact the layers of catalytic material.

The invention is not to be limited to the specific embodiments shown or the specific examples given, nor to any theories advanced as to the operation of the invention.

I claim:

1. An apparatus for carrying out catalytic reactions comprising a horizontal shell with a central duct arranged in spaced relation to walls of the said horizontal shell closed at one end inside of the shell and the opposite end arranged with an inlet leading through the horizontal shell, super-imposed horizontal layers of beds containing solid catalytic material in granular form arranged within the horizontal shell forming continuous layers between the horizontal shell and the walls of the central duct, a space above and a space below the said super-imposed layers and said duct, and open spaces between the said super-imposed layers and adjacent said duct, ports in said central duct communicating with the open spaces between the super-imposed layers containing solid catalytic material, an outlet in said shell for withdrawing the fluid from the spaces above and below the super-imposed layers of solid catalytic material, whereby fluid may be passed into said duct, through said ports, through said layers in parallel, and be withdrawn from above and below said beds from said shell, an inlet in said shell for passing fluid into the space below the super-imposed layers of solid catalytic material, internal means for directing the direction of flow of said last named fluid from the space below the super-imposed layers of beds up through said layers and an outlet in said shell for withdrawing the fluid from the space above the super-imposed layers.

2. An apparatus for carrying out catalytic reactions according to claim 1, in which said internal means is a hinged plate arranged to stop or allow the flow of material from the space below the said super-imposed layers containing solid catalytic material to the outlet of the horizontal shell.

GILBERT D. DILL.